United States Patent [19]

Johnson

[11] Patent Number: 5,245,738
[45] Date of Patent: Sep. 21, 1993

[54] METHOD FOR SECURING TOGETHER AND NON-EXPLOSIVELY SEPARATING MULTIPLE COMPONENTS

[75] Inventor: Alfred D. Johnson, Berkeley, Calif.
[73] Assignee: TiNi Alloy Company, Oakland, Calif.
[21] Appl. No.: 750,493
[22] Filed: Aug. 27, 1991

Related U.S. Application Data

[60] Division of Ser. No. 591,628, Oct. 2, 1990, Pat. No. 5,119,555, which is a continuation-in-part of Ser. No. 246,518, Sep. 19, 1988, abandoned.

[51] Int. Cl.$^5$ .................. B23P 17/00; B23P 19/02
[52] U.S. Cl. .................... 29/413; 29/426.4; 29/447
[58] Field of Search .................. 29/412–417, 29/446, 447, 426.1, 426.4, 426.5; 337/123, 140, 141, 296; 403/28, 29, 30; 411/1–5, 390, 392, 396, 411, 424, 909

[56] References Cited

U.S. PATENT DOCUMENTS

| | | | |
|---|---|---|---|
| 3,408,890 | 11/1968 | Bochman, Jr. | 411/396 X |
| 3,454,286 | 7/1969 | Anderson et al. | 403/28 X |
| 3,546,996 | 12/1970 | Grijalva et al. | 411/390 |
| 4,485,545 | 12/1984 | Caverly | 403/28 X |
| 4,567,549 | 1/1986 | Lemme | 337/140 X |
| 4,753,465 | 6/1988 | Dalby | 292/32 |
| 5,160,233 | 11/1992 | Darin | 411/909 X |

FOREIGN PATENT DOCUMENTS

1434314 10/1988 U.S.S.R. .................. 411/909

Primary Examiner—Timothy V. Eley
Attorney, Agent, or Firm—Flehr, Hohbach, Test, Albritton & Herbert

[57] ABSTRACT

A non-explosive separation device for releasably holding together components of equipment or apparatus which are to be separated under controlled conditions. The separation device and method of operation includes a retaining element having a strain concentrated portion which completely cleaves when strained at a predetermined magnitude. Strain is applied to the retaining element by an actuating element which is comprised of a solid state phase change material having a shape memory. The actuating element is deformed to an armed shape at a temperature below the phase-change transition temperature. The device is activated by heating the actuating element through its transition temperature so that it recovers toward its memory shape. The retaining element is strained beyond its ultimate strength so that it cleaves at the strain concentrated portion. One embodiment of the invention provides a method for the non-destructive testing of the integrity and readiness of the separation device as well as a method of calibrating the release point of the device.

9 Claims, 3 Drawing Sheets

METHOD FOR SECURING TOGETHER AND NON-EXPLOSIVELY SEPARATING MULTIPLE COMPONENTS

This is a division of application Ser. No. 07/591,628 filed Oct. 2, 1990, now U.S. Pat. No. 5,119,555, which is a continuation-in-part of application Ser. No. 246,518 Sep. 19, 1988, abandoned.

BACKGROUND OF THE INVENTION

This invention relates to separation devices of the type used to fasten, retain or latch together components of apparatus or structure which are to be separated or released under controlled conditions. In particular, the invention relates to a non-explosive separation device for applications such as providing a safe and reliable replacement for explosion-actuated fasteners or explosive bolts.

Explosion-actuated separation devices such as explosive bolts have been used in a wide variety of applications in which components or parts of a device or structure are secured together for quick separation when the explosive device is activated. Explosive bolts of this type have been utilized for the deployment of payloads of space vehicles, for the safing and arming of ordnance and for the release of emergency hatches. They have also found application for the underwater release of elements, for example oceanographic equipment or for the recovery of instrument packages from torpedoes used in target practice.

While the explosive bolt technology has been developed to a high degree, their use for many applications presents a number of problems and limitations. When explosive bolts are actuated the resulting mechanical shock can cause unintended damage to associated structures, such as protective shrouds and fairings, and to equipment, for example to the electronics in payloads or to instrument packages of the components being separated. The explosion devices are also relatively sensitive such that they are hazardous to store and use. When actuated shrapnel from the explosive devices can cause injury to personnel and damage to surrounding equipment.

Another disadvantage from existing explosion-actuated separation devices is that there is no reliable non-destructive method for testing the integrity of the separation device in a stand-by mode. Furthermore, the deflagrating charges employed in such explosion-actuated devices are subject to deterioration over time with the result that they do not have a long shelf life. Explosive bolts are also relatively difficult to install in that special tools and trained personnel are normally required for safely installing and wiring the devices.

Among the prior art separation devices is the mechanism described in U.S. Pat. No. 3,454,286 which employs a fusible material that melts upon heating from ignition of a combustible material to release the elements that are being held together. While such a device is relatively safer in operation as compared to explosive bolts, it also presents a number of disadvantages and limitations such as limited shelf life of the combustible material and the limitations on testing of the actuating circuit and predicting the precise release point of the device.

A further prior art releasable latch mechanism is disclosed in U.S. Pat. No. 3,546,996 where a rise in temperature arms the device through a differential in thermal expansion of two elements. A subsequent drop in temperature causes thermal contraction of the elements back to ambient which ruptures one of the elements to release the latch. Such a mechanism also presents a number of disadvantages and limitations. Operation of the mechanism is dependent upon the relatively low coefficient of thermal expansion of the metal elements. This requires a large temperature excursion, and consequently a relatively long time period, to build up the requisite tension forces. Additionally, such a mechanism has poor operating sensitivity with the result that it is difficult to predict and control the point in the thermal cycle where the rupture will occur. Consequently such latch mechanisms have only a limited scope of application and generally are not adaptable as replacements for explosive bolts of the type now in use.

It is therefore a general object of the present invention to provide a separation device and method of operation which secures components of an apparatus together for non-explosive separation under controlled conditions.

Another object is to provide a separation device and method of the type described in which a shape-memory alloy material operates in a manner to separate the retaining element of the device into exactly two pieces.

Another object is to provide a non-explosive separatation method of the type described using the 3 percent elongation of a shape memory alloy actuator to cause a 20 percent or more strain in the strain concentrated portion of the retaining element.

Another object is to provide a separation device and method of the type described in which, at the time of separation, the energy for operating the shape-memory alloy material is relatively small and is released over a relatively long time span as compared to the large energy release over a very short time span in an explosion separation device.

Another object is to provide a separation device and method of the type described which safely operates in a manner to minimize unintended damage to associated equipment and to also minimize risk of injury to personnel.

Another object is to provide a separation device and method of the type described which safely captures the two parts of the retaining element that are separated following actuation.

Another object is to provide a separation device of the type described which is durable and is not subject to deterioration over time such that it has a relatively long shelf life.

Another object is to provide a separation device of the type described in which the shape-memory alloy actuator can be operated an indefinite number of times so that the separation device is reusable upon replacement of the retaining element.

Another object is to provide a separation device of the type described which is compact, exerts a relatively high separation force for its size and which can be easily installed without the requirement of special tools.

Another object is to provide a separation device of the type described which is reliable in operation by being triggered through a simple heat source, such as an electrical or chemical heat source.

Another object is to provide a separation device and method of the type described in which the shape-memory alloy material is a part of the circuit with a current overload generating heat which causes separation of an element which opens the circuit.

Another object is to provide a separation device and method of the type described in which a relatively long and thin shape-memory alloy element is operated by a conventional electrical power source with the resulting force multiplied by means of lever action to cause a retaining element to separate into two parts.

Another object is to provide a separation device of the type described by which the separation time following activation of the heating phase can be predicted with accuracy.

Another object is to provide a separation device of the type described with lower, and therefore safer, activating voltages making the device suitable for use in applications having explosive atmospheres.

Another object is to provide a method for the non-destructive testing of the integrity and readiness of the actuator circuit for a separation device of the type described.

Another object is to provide a method of calculating the time of release in a separation device of the type described.

SUMMARY OF THE INVENTION

The invention in summary provides a non-explosive, integral separation device and method which holds multiple components of an assembly together and which is actuated to separate the components under controlled conditions. The components are held together by a retaining element which is formed with a strain concentrated portion. The retaining element is coupled with an actuating element which is comprised of a solid state phase change material having a shape memory. The actuating element is heated through its phase-change transition temperature which causes the material to apply a force which strains the retaining element to a point at which its ultimate strength is exceeded such that it cleaves into exactly two parts and releases the components. A method is also provided for the non-destructive testing of the integrity of the device by the controlled application of electrical current through the actuating element for starting the phase change. Another method is provided for predicting the time of separation of the device by measuring the amount of strain in the retaining element while controlling the flow of current.

The foregoing and additional objects and features of the invention will appear from the following description in which the preferred embodiments have been set forth in detail in conjunction with the drawings.

DETAILED DESCRIPTION OF THE PREFERRED EMBODIMENTS

Figure 1:
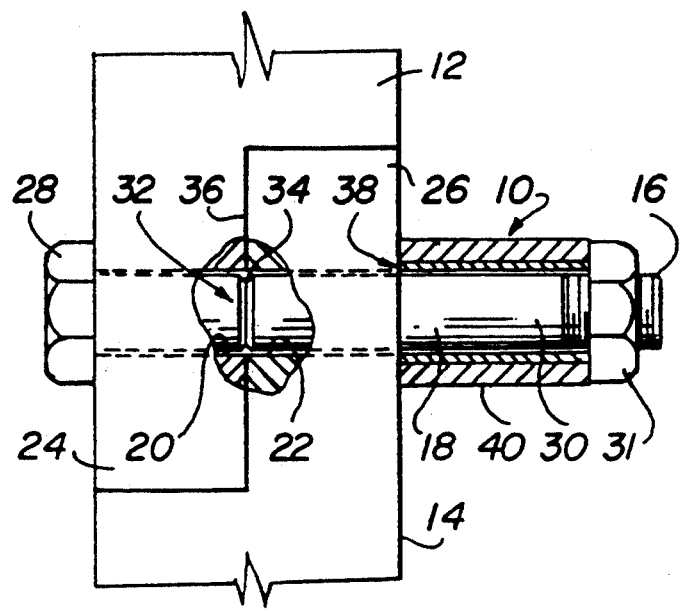
FIG. 1 is a side elevation view, partially broken away, of a non-explosive release device according to one preferred embodiment of the invention.

In the drawings FIG. 1 illustrates generally at 10 a non-explosive separation device for releasably fastening the separation rings 12, 14 which are components of a space vehicle payload, not shown. While the embodiment of FIG. 1 will be explained in relation to use with such a space vehicle payload, the invention is adapted for use in a wide variety of other end use applications, as will appear from the following.

Separation device 10 is comprised of a retaining element 16, shown as a bolt having a shank 18 which extends through aligned openings 20, 22 formed through flanges 24, 26 of the mating separation rings. A bolt head 28 at the proximal end of the retaining element abuts the outer surface of flange 24 and the element's distal end 30 projects outwardly beyond the outer surface of the opposite flange 26. A lock nut 31 is mounted on the threaded distal end 30.

Retaining element 16 is formed with a strain concentrated portion 32 at the point of intended separation. In the illustrated embodiment the strain concentrated portion is created by forming a V-shaped groove 34 about the circumference of shank 18 within the plane of the interface 36 between the mating flanges. The groove forms a necked-down zone of reduced cross-sectional area in the shank at which strain is concentrated when the bolt is under tension. The depth of the groove, and thereby the area of the reduced cross-section, is predetermined in accordance with the requirements and conditions of a particular application. In general the area of the reduced cross-section is one of the factors which determines the magnitude of the required tension to cause the strain concentrated portion to stretch beyond its ultimate tensile strength and cleanly sever the bolt into two separate parts. As used herein the term "strain concentrated portion" encompasses the use of a reduced cross-sectional area as in this embodiment as well as shear pins and detents which shear or break when strained, diaphragms and seals which rupture when strained and any type of hooks, connectors or other similar elements which break, fracture or otherwise separate when sufficiently strained. The invention also encompasses the use of a retaining element having a strain concentrated portion which fractures when a sufficient compression load is applied.

Device 10 further includes actuating element 38 which, when triggered, applies the requisite force to sever the retaining element at its strain concentrated portion so that exactly two fragments are produced. Actuating element 38 is comprised of a solid state phase change material having a shape memory which undergoes recovery from an armed shape to a memory shape when heated through the material's phase-change transition temperature range. As used herein the phrase "heated through the phase-change temperature range" means heating the material to a temperature which is either within the band of temperature at which the phase change takes place or to a higher temperature. The phase-change temperature range is determined by the particular alloy's composition, heat treatment and stress. As used herein the words "armed shape" mean the shape to which the shape memory material is stretched, compressed, bent, twisted or otherwise deformed while below the transition temperature.

In this embodiment actuating element 38 is in the form of a hollow cylinder mounted concentric about shank distal end 30. The inner end of element 38 abuts the outer surface of flange 26 and its outer end abuts lock nut 31. In this form of the actuating element the shape memory material of which it is comprised creates the tension force to trigger separation of the retaining element by elongating when heated through the transition temperature.

The phase-change material for the actuating element is a shape memory alloy (also termed SMA), which preferably is TiNi (Nitinol), an alloy of nearly equal atomic amounts of nickel and titanium. Other suitable shape memory materials include CuAlNi and TiNiPd alloys. These shape memory materials are characterized in being easily deformed when cold (i.e. at a temperature below the transition temperature) and which produce large stresses, with shape recovery of several percent, when heated through the austenitic phase change range (i.e. the transition temperature). The stresses which can be produced by the shape memory materials can be as large as 50 Ksi, depending upon the particular composition of the alloy. The phase change transition temperature is also predetermined in accordance with the particular composition of the alloy which is employed. Depending upon the particular application the phase change transition temperature can be in the range from cryogenic to 200° C.

With a shape memory material having a known percentage shape recovery, which is axial elongation in the embodiment of FIG. 1, then the minimum axial length of actuating element 38 is calculated based upon the change in length of retaining element 16 which is required to cause strain concentrated portion 32 to fail. For typical metals this strain is substantially 30 percent. The percentage shape recovery of the actuator 38 is typically 3 percent. Therefore for metals the strain must be multiplied by a factor of at least 10 in the strain concentrated portion. This is accomplished by making the actuator at least 10 times as long as the strain concentrated portion. Because the entire length of the retaining element 16 is under tension, additional displacement occurs because of the elastic deformation of element 16. This elongation serves no purpose in the separation device, but must be accommodated in the design. The actuating element 38 must be long enough so that when it elongates 3 percent it stretches the bolt elastically and stretches the strain concentrated portion beyond its strain fracture limit. With the length of the actuating element known, its required cross-sectional area is determined based upon the desired stress in shape memory material and the force required for stretching the retaining element. The stress-strain characteristics of the retaining element in turn are determined by its particular composition. Metals and alloys such as steel, brass and bronze are suitable for forming the retaining element in this invention, although other materials with similar physical properties could also be employed depending on the requirements of a particular application. With the required mass of the shape memory material determined for the particular application, the heat input rate required to heat the material through its phase change transition temperature in the desired time period is calculated.

Where the strain concentrated portion is formed of non-metals with properties which cause failure under strains of greater than 30 percent, for example a hard plastic, or less than 30 percent, for example ceramic, then the length of the SMA actuator would be correspondingly increased or decreased. The method for sizing the elements in general is in accordance with the following. The SMA actuator elongates to stretch the retaining element and fracture the strain concentrated portion in accordance with:

$$S_A \cdot L_A = S_R \cdot L_R + S_C \cdot L_C \qquad \text{(Equation 1)}$$

where:
- $L_A$ is the length of the SMA actuator;
- $L_C$ is the length of the strain concentrated portion of the retaining element;
- $L_R$ is the length of the retaining element;
- $S_C$ is the percent strain elongation of the strain concentrated portion to failure;
- $S_A$ is the percent shape recovery of the actuator; and
- $S_R$ is the percent elongation of the retaining element.

Because $L_A$ is substantially the same as $L_R$ then:

$$(S_A - S_R) L_A = S_C \cdot L_C \qquad \text{(Equation 2)}$$

Equation 2 translates to give the maximum $L_C$ as follows:

$$L_C = \frac{S_A - S_R}{S_C} \cdot L_A. \qquad \text{(Equation 3)}$$

An example of the application of equation 3 is where $S_A = 3\%$, $S_R = 1\%$, $S_C = 20\%$, and $L_A = 1$ inch, giving $L_C = 0.1$ inch.

The strain $S_R$ can be calculated as follow:

The force F required to sever the strain concentrated portion is $$F = U_C \cdot A_C \qquad \text{(Equation 4)}$$

where:
$U_C$ is the ultimate strength of the strain concentrated portion and $A_C$ is the cross-sectional area of the strain concentrated portion.

The same force F stretches the retaining element in accordance with:

$$F = S_R \cdot E_R \cdot A_R \qquad \text{(Equation 5)}$$

where:
$E_R$ is the modulus of elasticity of the retaining element, and $A_R$ is the cross-sectional area of the retaining element.

Combining equations 4 and 5 the strain is in accordance with the following:

$$S_R = \frac{U_C}{E_R} \cdot \frac{A_C}{A_R}. \qquad \text{(Equation 6)}$$

The source of the heat input into actuating element in the embodiment of FIG. 1 comprises a body 40 of a chemical heating compound which exothermically reacts when activated. In the embodiment body 40 is in the form of a hollow cylinder which is mounted about and in close-spaced heat exchange relationship with actuating element 38. The axial length of body 40 is commensurate with the length of the actuating element so that heat from the chemical reaction is transferred primarily by conduction uniformly into the shape memory material. Among the exothermic chemical heating compounds suitable for use with the invention is Pyrofuze with palladium and aluminum. Pyrofuze is a brand name of Sigmund Cohn Corp. for an exothermic compound as disclosed in U.S. Pat. No. 2,911,504. Exothermic reaction in the heating compound is activated by suitable means such as an electric current from a power source, not shown. The invention contemplates that other heat sources could be employed, such as a coil of resistance heating wire which encircles actuating element 38 and is connected through a suitable control circuit with an electrical power source, not shown.

The method of operation includes installing separation device 10 by inserting retaining element shank 18 through aligned openings 20,22 until bolt head 28 is flush with flange 24. Actuating element 38 is then mounted over distal end 30 of the shank and heating compound ring 40 is then slipped over the actuating element. At this point in the procedure the temperature of the actuating element is below its phase change transition temperature. Nut 31 is then threaded onto the end of the shank and tightened against actuating element 38 by a wrench or other suitable tool until the element is axially compressed through a distance equal to the percent elongation that has been predetermined, as explained above, for the change in length required to sever the shank at strain concentrated portion 32. For example, where the shape memory material is Nitinol the axial compression is in the range of 3 to 8 percent for this purpose. An alternative method is to cool and compress the actuating element prior to installation on the bolt, which is then tightened on the element. After the retaining element is compressed the required amount it is in its armed shape and is held in this condition by nut 31 throughout the time device 10 functions as a fastener for holding the flanges of the separation rings 12,14.

When it is desired to separate the flanges the chemical heating compound of body 40 is activated to generate the exothermic heat which is transferred into actuating element 38. When the actuating element is heated through its transition temperature the crystalline phase change is initiated and element 38 begins to recover by elongating axially to its memory shape, namely its original length before being compressed by the nut. Because the actuating element, as it begins to elongate, is constrained between nut 31 and flange 26 the effect of the crystalline phase change is to build up a large compressive force which acts against the nut and flange. This creates a corresponding tension force in retaining element 16. The resulting increase in tension on the retaining element produces strain which is concentrated at portion 32. As the heat input continues the rapid increase in stress at the concentrated area causes the ultimate tensile strength of the material to be exceeded. The material then fails in tension and the bolt shank is severed into two parts. The flanges of the rings are thereby separated to release the payload or other equipment.

EXAMPLE I

In the configuration of device 10 of FIG. 1 the material of actuating element 38 is comprised of TiNi (Nitinol) having a shape memory change of 3 percent and a nominal stress level of 30 Ksi. Retaining element 16 is a threaded bolt having a nominal diameter of 0.25 inches, a root thread diameter of 0.188 inches and a length of 1.5 inches for mounting through a combined width of 0.5 inches of the two joined flanges. The material of the bolt is hardened steel (AISI 1030) having a yield strength of 94 Ksi, an elastic modulus of 30 (Psi EE6), an ultimate strength of 123 Ksi and 17 percent elongation to its ultimate tensile strength. The strain concentrated portion 32 of the bolt shank is formed by the groove 34 having a depth of 0.05 inches and a width of 0.05 inches giving a groove cross-section of 0.0177 sq. in. The change in length of the strain concentrated zone required to cause separation is 0.0085 inches. The tensile force to cause failure is 2174 lbs. This tensile force causes the threaded bolt to elongate elastically 0.004 inches. Therefore the minimum actuator shape-change is 0.0085+0.004=0.0125 inches. At 3 percent strain, the minimum actuator length is 0.42 inches. A force of 2174 lbs is exerted by a TiNi cylinder with outside diameter 0.4 inches and internal diameter of 0.26 inches under a stress of 30 Ksi. The cross-sectional area of the cylinder is 0.073 sq. in., and its length is 0.42 inches, which requires a mass of 3.2 grams. Assuming that the heat required is 50 Joules per gram with no heat loss, the minimum heat input required from the heat source is equivalent to 160 watt-sec. The phase change transition temperature range of the TiNi material to which it is heated for actuating device 10 is 50° C. to 70° C.

EXAMPLE II

In the configuration of device 10 of FIG. 1 the material for actuating element 38 is comprised of TiNi (Nitinol) having a shape memory change of 3 percent and a nominal stress level of 30 Ksi. Retaining element 16 is a threaded bolt having a nominal diameter of 0.25 inches, a root thread diameter of 0.188 inches and a length of 1.5 inches for mounting through a combined width of 0.5 inches of the two joined flanges. The material of the bolt is brass (MUNTZ METAL) having a yield strength of 20 Ksi, an elastic modulus of 13 (Psi EE6), an ultimate strength of 54 Ksi and 45 percent elongation to its ultimate tensile strength. The strain concentrated portion 32 of the bolt shank is formed by the groove 34 having a depth of 0.05 inches and a width of 0.05 inches giving a groove cross-section of 0.0177 sq. in. The change in length of the strain concentrated portion required to cause separation is 0.0225 inches. The tensile force to cause failure is 954 lbs. This tensile force causes the threaded bolt to elongate elastically 0.004 inches. Therefore the minimum actuator shape-change is 0.0225+0.004=0.0264 inches. At 3 percent strain, the minimum actuator length is 0.9 inches. A force of 954 lbs is exerted by a TiNi cylinder with outside diameter 0.33 inches and internal diameter 0.26 inches under a stress of 30 Ksi. The cross-sectional area of the cylinder is 0.032 sq. in., and its length is 0.9 inches, which requires a mass of 3.1 grams. Assuming that the heat required is 50 Joules per gram with no heat loss, the minimum heat input required from the heat source is equivalent to 155 watt-sec. The phase change transition temperature range of the TiNi material to which it is heated for actuating device 10 is 50° C. to 70° C.

Figure 2:
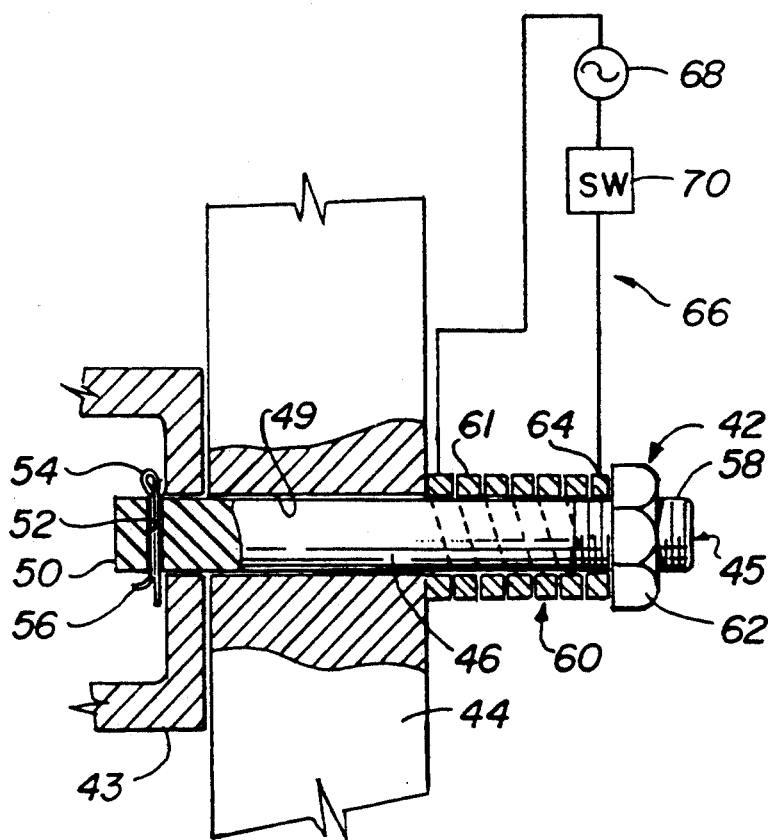
FIG. 2 is a side elevational view similar to FIG. 1 illustrating another embodiment of the invention.

FIG. 2 illustrates another embodiment providing a non-explosive separation device 42 for releasably fastening together components 43, 44 of buoyant oceanographic equipment which is to be released from an underwater location by remote control. Device 42 is comprised of a retaining element 45 in the form of a headless bolt having a shank 46 which extends through aligned openings 48, 49 formed in the two components which are to be separated. The proximal end 50 of the shank projects beyond the outer surface of component 43. A transverse bore 52 is drilled diametrically through the shank proximal end and a shear pin 54, which is the strain concentrated portion, is inserted through this opening with the pin's free ends 56 bent back to lock the pin in place.

Distal end 58 of the shank projects beyond the outer surface of the opposite component 44 for mounting actuating element 60. In this embodiment actuating element 60 comprises a length of solid state phase change material wound in a helical coil 61 having an inner diameter commensurate with the diameter of shank 46. Preferably the coil turns are formed with a cross-section which is a parallelogram, such as rectangular, square or rhombic. The turns of the coil are mutually insulated electrically by suitable means such as a thin film of epoxy, not shown, bonded to the outer surface of the shape memory material. The coil is tightly wound with its turns in abutting relationship so that the turns combine to form a semi-rigid annulus. The distal end of the shank is threaded and a nut 62 is turned onto the threaded end in abutment with the end turn 64 of the coil.

In the embodiment of FIG. 2 the means for heating the shape memory material comprises electric control circuit 66 of which coil 61 is an integral component. Circuit 66 comprises an electric power source 68, such as an alternating current supply, connected in series with an on-off control switch 70 which in turn is connected in series with the coil's end turn 64.

Separation device 42 of FIG. 2 is installed by the method of inserting shank 46 through the aligned openings 48, 49 of the components with shear pin 54 locked into bore 52 at the proximal end. Actuating element 60 is then mounted over distal end 58 and the opposite end turns of the coil are connected with the wiring of control circuit 66. Nut 62 is then threaded onto the shank and tightened against turn 64 until the coil is axially compressed through a distance which is equal to the percent elongation that has been predetermined for a change in shank length required to sever the shear pin. The coil is then in its armed shape and device 10 functions as a fastener holding the components of the oceanographic equipment in place.

At the point in time in which it is desired to release the underwater equipment the control circuit switch 70, which can either be remotely located or itself controlled from a remote location, is operated to close the circuit and direct current through coil 61. Heat input into the coil is directly from the resulting resistance heating. As the coil temperature reaches the transition temperature the crystalline phase change is initiated. The coil begins to recover by elongating axially to its memory shape, which was its original length before being compressed by nut 62. Because the outer end of the coil is constrained by the nut the coil generates a strong compressive force which acts against the nut to create a corresponding tension force along the shank. This tension force tends to pull shear pin 54 against the edges of opening 48. This creates a shear stress through the cross-sections of the pin ends at the points at which they emerge from bore 52. When the ultimate strength of the shear pin material is exceeded the ends of the pin fail and separate from the portion of the shear pin which is disposed within the bore. This frees component 43 from retaining element 45 and the buoyant equipment to which the component is attached is free to rise to the surface of the water.

Figure 3:
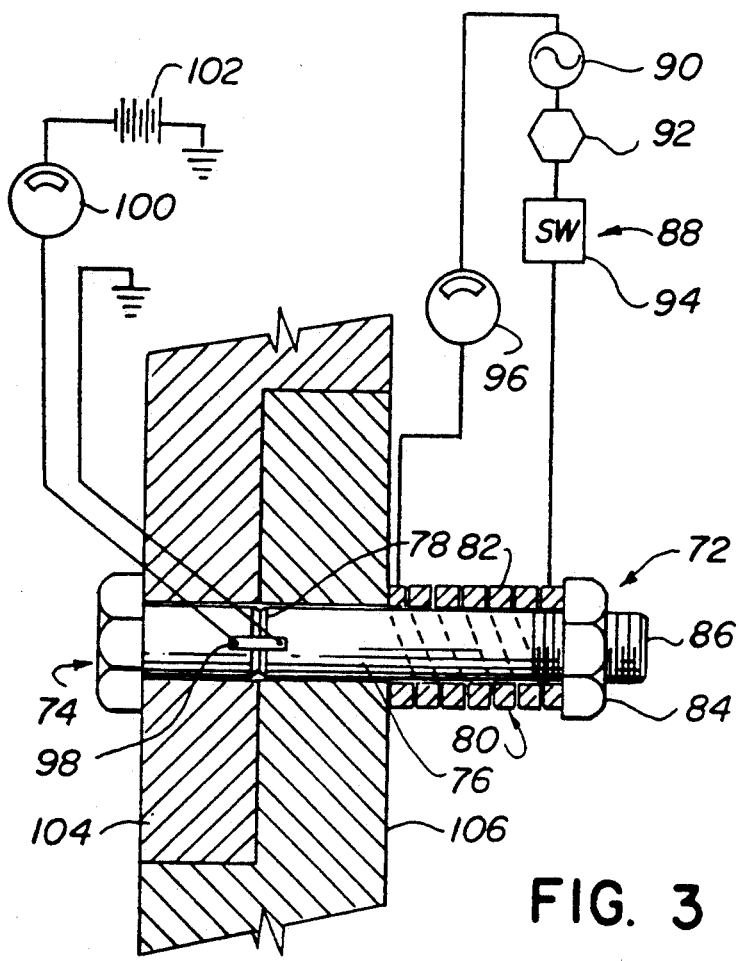
FIG. 3 is a schematic diagram illustrating a control circuit by which the method of operation of another embodiment of the invention is carried out.

The schematic diagram of FIG. 3 illustrates an embodiment providing a system of apparatus and method for the non-destructive testing of the integrity and stand-by readiness of a separation device 72. This invention further provides apparatus and method for calibrating the separation device to provide the capability of predicting the point in time at which separation will occur.

Separation device 72 includes a retaining element 74 similar in construction to the bolt in the device of FIG. 1. The retaining element includes a shank 76 formed with a circumferential groove 78 which reduces the cross-sectional area to provide the strain concentrated zone. The distal end 86 of the shank carries an actuating element 80 which is comprised of a length of shape memory material formed in an helical coil 82 in the manner described above for the coil of FIG. 2. A nut 84 is threadably mounted on distal end 86 for compressing the coil to its armed shape while at a temperature below the transition temperature, also in the manner described above in connection with FIG. 2.

A control and test circuit 88 is provided and includes a source of electrical power 90 which can be an alternating current supply. Power source 90 is connected in series with a current regulator 92 and on-off switch 94 which in turn is connected in series with one end turn of coil 82. The opposite end turn of the coil is connected in series with current meter 96 which is connected back to the power source.

A strain gauge 98 is mounted across the strain concentrated portion 78 of shank 76 and the strain gauge is connected in series with a voltage meter 100 and power source 102, preferably a direct current supply.

In the method of operation of the control and test system of FIG. 3 retaining element 74 is mounted to secure components 104, 106 together in a stand-by mode with actuating element coil 82 compressed to its armed shape by nut 84. In the method of testing the integrity and readiness of the separation device switch 94 is first operated to close the circuit. The power source is regulated at 92 to direct a current through coil 82 which is less than the full current required to cause the device to separate in a specified test time. The flow of current is detected by meter 96 which visually indicates that the circuit is complete. This test provides assurances that the full current flow will operate properly to trigger actuating device to sever retaining element 74. In addition to or as a replacement for meter 96 circuit 88 could include a remote indicator lamp or signalling device, not shown, which generates a signal at a remote location, for example as an input into a computer which is set up to monitor readiness of the system.

The method of operation of the circuit of FIG. 3 for calibrating device 72 is initiated with actuating element coil 82 in its armed shape at a cold temperature. Switch 94 is closed and current regulator 92 adjusted to direct an amount of electrical energy into the coil which is sufficient to raise its temperature just up to the lower limit of the transition temperature such that the crystalline phase change is initiated. As coil 83 begins to recover by elongation toward its memory shape a tension force is applied to begin to initially stretch shank 76. The resulting strain at the strain concentrated portion 78 is sensed by strain gauge 98 as the gauge stretches and changes resistance value which in turn is detected by meter 100. The change in strain as indicated by the meter is recorded as a function of current flow into the coil. These two values are plotted and extrapolated so that the amount of current flow required to generate sufficient strain to cause separation can be predicted.

The invention provides the following method for predicting the time of separation, following initial actuation, of a retaining element using a resistance-heated SMA actuator of specific shape, size and material composition. Where the heat energy to cause the SMA material to actuate is input as electrical power over a period of time, then part of this energy $E_1$ is used to heat the SMA metal in accordance with:

$E_1 = C_P(t1 - t2) =$ approximately 25 joules per gram if temperature difference is 70° C., where $C_P$ is the amount of heat absorbed per degree rise in temperature per gram, and
where t1 is the initial time of activation and t2 is the time of separation.

An additional part of the heat input "h" goes into driving the SMA phase change in accordance with:

h = approximately 25 joules per gram.

Therefore the total energy input $E_T$ is needed, starting at room temperature and ending at 90° C. (assuming the phase-change transition temperature is 90° C.)is:

$E_T = (C_P(T1 - T2) + h) * mass$ where T1 is the initial temperature, T2 is the phase-change transition temperature, and $T1 - T2 = 70°$ C.

This energy is delivered as electrical current, and the instantaneous rate of energy input is equal to:

$I^2R$ (watts=joules/second)

where I is the constant current and R is the resistance through the SMA material.

Hence, $I^2R(t1-t2) = (C_P(T1-T2)+h)*mass$.

An example of application of the foregoing method of prediction is as follows. Assume that the mass of the actuator is 20 grams, the resistance of the SMA metal is 10 ohms, and the constant current is 4 amperes, then Time Interval = $(C_P(T1 - T2) + h) * mass/I^2R$
= (50) * (20)/(16) * (10) = 6.25 seconds The foregoing method of calculation results in 6.25 seconds as the predicted time of actuation after the current is turned on under the given conditions.

Figure 4:
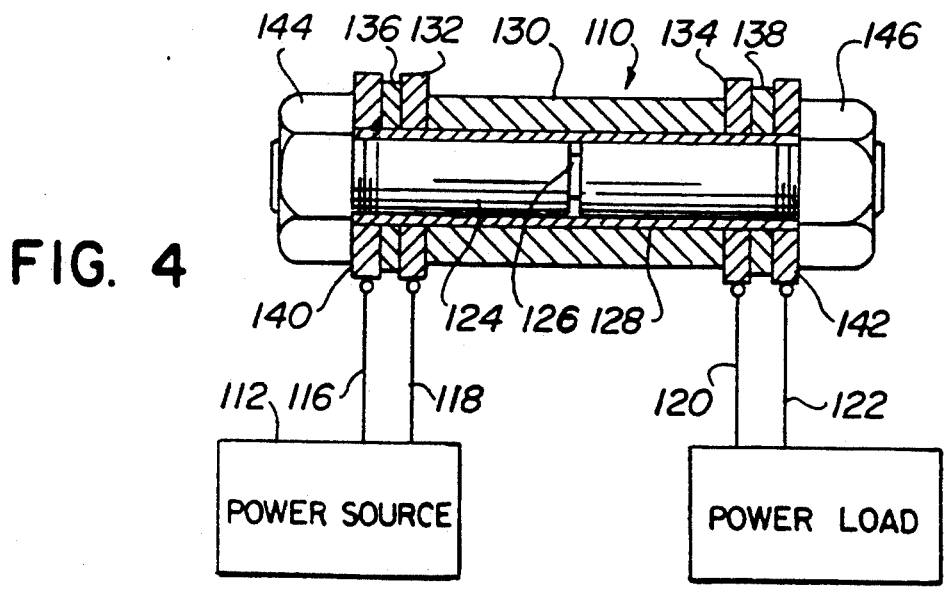
FIG. 4 is an axial section view of a heavy-duty circuit interrupter incorporating another embodiment of the invention.

FIG. 4 illustrates a heavy-duty circuit interrupter 110 in accordance with another embodiment of the invention. Circuit interrupter 110 is incorporated in a power distribution system which includes an electrical power source 112 and a power load, which is illustrated schematically by the block 114. Large AC currents on the order of millions of amperes are directed from source 112 through heavy gauge electrical conductors 116, 118 into circuit interrupter 110 and then through electrical conductors 120, 122 to the load.

Circuit interrupter 110 includes a separation element 124 in the form of a headless bolt which is threaded at both ends. The midspan of the bolt is formed with a strain concentrated portion which comprises a circumferential groove 126. The groove forms a reduced cross-sectional area in the shank where the strain is concentrated when the bolt is under tension. An electrical insulation sleeve 128 is fitted about the shank of the bolt with the two threaded bolt ends extending beyond the ends of the sleeve. An actuating element 130 comprised of a shape-memory alloy material in the form of a tube is fitted about insulation sleeve 128. A pair of washers 132, 134 of a suitable electrical conducting metal such as cooper are fitted over the sleeve and abut respective ends of actuating element 130. A pair of electrical insulation rings 136, 138 are mounted over the sleeve and abut the outer sides of respective washers 132 and 134. Mounted against the outer sides of rings 136 and 138 are another pair of electrically conducting washers 140, 142. The actuating elements, washers and insulation rings are held in place by a pair of nuts 144, 146 which are mounted on respective threaded ends of separation element 124. The bolts are tightened so that good electrical contact is made between the bolts and outre washers 140 and 142 as well as between separation element 124 and the inner washers 132 and 134. Conductors 116 and 118 are electrically attached to respective washers 140 and 132 by means such as brazing, while the conductors 120 and 122 leading to load 114 are also electrically attached to washers 134 and 142.

In the method of operation of circuit interrupter 110, under normal power distribution conditions the circuit is established from source 112 through conductor 116, washer 140 and nut 144 into separation element 124. The circuit continues from the separation element through nut 146, washer 142 and conductor 122 into load 114. From the load the circuit continues through conductor 120 and washer 134 into actuating element 130. From the actuating element the circuit returns to the source through washer 132 and conductor 118.

When an extreme overload condition in the circuit occurs the resulting resistive load through actuating element 130 causes the temperature of the shape-memory alloy material to rise to the phase change transition temperature. The high current causes the SMA actuating element to undergo a rapid phase change, which can be on the order of a millisecond or less, as it recovers to its memory shape by elongating. The rapid elongation causes the strain concentrated portion at groove 126 to cleave and thereby cleanly separate the bolt into two fragments. The elastic energy stored in the bolt causes the two fragments to quickly move apart. This sharp separation of two bolt fragments rapidly extinguishes the plasma arc which occurs in the inductive load.

Among the advantages of the circuit interrupter 110 of this embodiment is that there is minimal temperature de-rating. No change in the current-carrying capacity of the circuit occurs until the phase change transformation temperature of the shape-memory allow material is reached, at which time a large displacement of the bolt fragments is produced. This overcomes any small errors in the system, with the result that the need to hand-tune the device is obviated. This is in comparison to circuit interrupters employing bi-metal actuators where the displacement is proportional to temperature such that it is necessary to hand-tune the bi-metal strips.

Circuit interrupter 110 is also characterized in having very high-speed operation as well as having low insertion losses. The resistive impedance is a small fraction of an ohm, with the result that less energy is wasted as compared to circuit interrupters employing bi-metal or solenoid actuators. The pure resistive load of circuit interrupter 110 favorably compares to the circuit interrupters employing solenoid actuators which have large energy stored in the electrical fields. The circuit interrupter of this embodiment also involves low production, maintenance and replacement costs as compared to circuit interrupters employing solenoid or bi-metal actuators.

Figure 5:
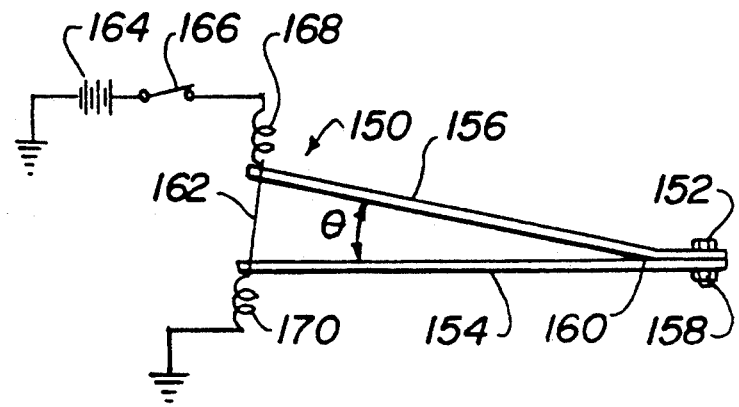
FIG. 5 is a front elevation view of a lever-action separation device in accordance with another embodiment.

The embodiment of FIG. 5 provides a lever-action separation device 150 which can achieve separation in relatively short time spans following activation. This separation device includes a retaining element 152 having a strain-concentrated portion as described for the embodiment of FIG. 1 such that the element cleaves into exactly two parts when the strain-concentrated portion is stretched beyond its elastic limit. The retaining element in FIG. 5 is shown as a bolt, which can be formed in the manner described for the bolt 16 in the embodiment of FIG. 1, or the element could comprise a rivet or other fastener formed with a strain-concentrated portion.

A pair of lever arms 154 and 156 are mounted together at their common ends, and the shank of retaining element 152 is fitted through aligned openings formed through the common ends. A nut 158 is turned down onto the threaded end of the bolt to hold the ends of the arms together. The first arm 154 is straight while the second arm 156 is bent at a fulcrum point 160, with the distal end of the second arm diverging from the first arm at a predetermined angle $\theta$. The two arms pivot about the fulcrum point in the manner of a first-order lever.

A length of small diameter SMA material, preferably in the form of a long thin wire 162, is connected between the distal ends of the first and second arms. An external source of electrical power, such as DC source 164, is connected through control switch 166 and a flexible conductor wire 168 to the end of SMA wire 162 which is attached to second arm 156. A second flexible conductor wire 170 is connected to the other end of the SMA wire and leads to ground.

In the operation of separation device 150, control switch 166 is closed to direct power into SMA wire 162, which is resistively heated to the material's phase-change transition temperature. The SMA wire undergoes the solid state phase change and recovers to its memory shape by contraction. This contraction of the wire applies a pulling force to the distal ends of arms 154 and 156. The lever action multiplies the applied force through the mechanical advantage to apply a large tension force between the head and nut of the bolt. The mechanical advantage depends upon the particular configuration of the lever arms. For example, assuming that the long lever distance is 30 inches and the short lever distance is 1 inch then the mechanical advantage is 30:1.

The large mechanical advantage realized through lever-action separation device 150 makes it possible to employ conventional power supplies to achieve rapid separation. This is in comparison to short and thick SMA actuators, such as a bolt, which would require a relatively large current and small actuating voltage, conditions which are not met with conventional power supplies. In certain applications, such as launch locks on space vehicles, parts of the space structure frame could be adapted for use as the lever arms in separation device. In such a case, operation of the SMA wire acting through the leverage of parts of the frame which form the arms would break the bolt and free a pair of members which could then be moved to another location and re-attached in space.

EXAMPLE III

In the configuration of separation device 150 of FIG. 5 the bolt is 0.500 inches in diameter and 1 inch long. A circumferential notch is formed at the midspan of the bolt's shank to form a strain-concentrated portion 0.050 inches wide and 0.200 inches in diameter. At the strain-concentrated portion the effective cross-section is 0.0314 inch$^2$. The bolt is formed of high-strength steel with an ultimate tensile stress of 200,000 psi. With these specifications, the strain-concentrated portion of the bolt will be stretched 20% of its length before failure. The SMA wire 162 is formed with a diameter of 0.094 inches and a cross-section of 0.007 inch$^2$. The permissible stress of the SMA with this configuration is 30,000 psi, and it will recover 0.025 of its length during shape recovery. The length of the long lever of arm 154 is 30 inches from pivot point 160, and the length of the short lever of this arm is 1 inch from the pivot point to the centerline of bolt 152. To cause the strain-concentrated portion of the bolt to fail it must be elongated 20% of its length, or 0.010 inches. With the 30:1 mechanical advantage the wire must therefore contract 0.3 inches. The required length of wire 162 is therefore $0.300/0.025 = 12$ inches. From this wire length the included angle $\theta$ between the long levers of the two arms is the angle whose tangent is 12/30, i.e. $\theta = 22°$.

Figure 6:
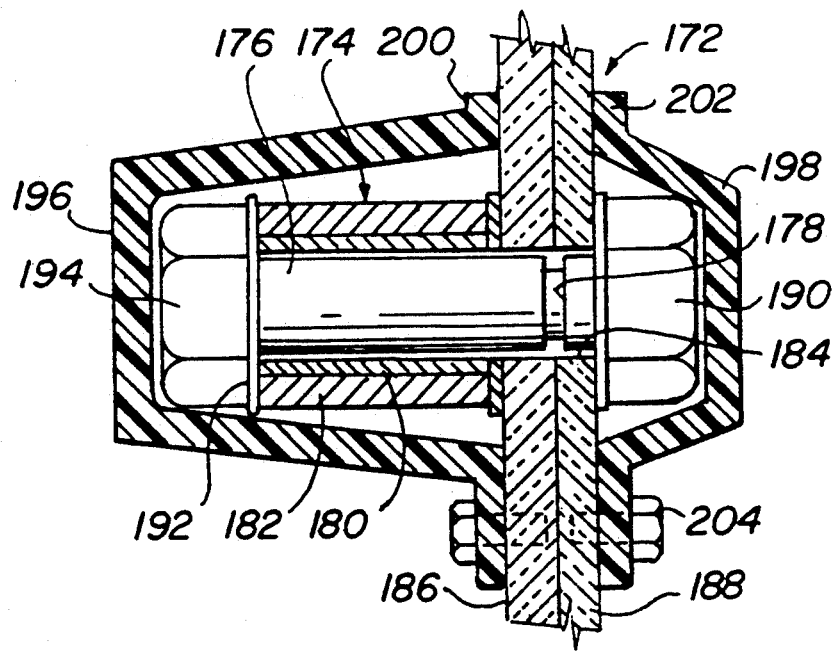
FIG. 6 is an axial section view of a separation device incorporating another embodiment which captures the separated fragments of the retaining element following actuation.

FIG. 6 illustrates an embodiment of the invention providing a separation device 172 by which the separated fragments of the retaining element 174 are captured after the device is operated. In separation device 172 the retaining element 174 is shown as a bolt having a shank 176 formed with a strain-concentrated portion 178 in the manner described for the bolt 16 of FIG. 1. The actuating element 180 comprises a cylinder of SMA material which is mounted concentric about the distal end of the bolt. The actuating element further includes a heat source 182, which can be a cylinder formed of a chemical heating compound as described for the body 40 of FIG. 1, or it could comprise a coil of electrical resistance heating wire. The shank of the bolt extends through aligned openings 184 in the two structural components 186, 188 which are releasably held together, with the bolt head 190 on one side of component, and the SMA cylinder and heat source on the opposite side. A washer 192 and nut 194 are mounted on the bolt end to hold the SMA cylinder and heater body in place.

A pair of cup-shaped caps 196, 198 are provided to capture the separated parts after device 172 is operated. The caps are formed of a resilient material having sufficient strength to absorb the energy from the parts as they are separated and fly apart. This results from the elastic energy which is stored in the bolt from the stress applied by the SMA actuator. Preferably the material of the caps is rubber or foam plastic. Rims 200, 202 on the caps are secured to components 186 and 188 by suitable means such as the fasteners 204 or by an adhesive. The body of cap 198 extends over and encloses bolt head 190, while the larger body of cap 196 extends over and encloses the distal end of the bolt and the parts mounted on that end.

In the method of operation of the embodiment of FIG. 6, the strain-concentrated portion of the bolt shank 176 is severed when the SMA cylinder 180 is heated through its transition temperature and elongates in the manner described for the embodiment of FIG. 1. The elastic energy in the stretched bolt is then released and converted into the kinetic energy of the two bolt fragments as they move apart. The two caps 196 and 198 stop movement of the bolt fragments with the resiliency of the caps absorbing the kinetic energy. The caps then serve to capture the separated parts, which can be removed as desired by dismounting the caps. The structure and method of operation of the caps in this embodiment provide a simple and relatively inexpensive energy absorber for capturing the separated fragments. This is in comparison to an explosion actuated separation device where a much more complicated and expensive arrangement would have to be provided to capture the shrapnel and other fragments resulting from the forceful explosion.

While the foregoing embodiments illustrate the use of the shape memory material which causes separation by generating large forces which cause failure of a bolt by tension stress as well as by causing failure of a pin by shear stress, the invention also encompasses applications in which the fastening element is severed by application of compression forces or by application of torsion forces. The invention also contemplates that the retaining element could comprise a detent, hook or connector which are severed by the forces created by the shape memory alloy. Other applications encompassed by the invention are frangible diaphragms and seals which are broken or ruptured by forces from the shape memory material in the manner described above. For example, a frangible diaphragm containing a gas or liquid under pressure could be ruptured by controlled movement of the shape memory material so as to release the contained gas or fluid when required by the particular application.

From the foregoing it is seen that there has been provided an improved non-explosive separation device which obviates many of the disadvantages and limitations of previously-proposed devices of this type. The separation devices of the present invention are highly reliable and relatively more safe than the type of explosive bolts which are presently in use. Upon actuation of the shape-memory alloy material the retaining element is cleanly severed into exactly two fragments. This has a number of important advantages, including being safer for personnel and surrounding equipment as compared to explosive bolts which are shattered into many small fragments that are driven off in many directions in the form of shrapnel. The invention obviates the problem of mechanical shock and flying shrapnel that can occur from an explosion-actuated separation device.

The separation device of the present invention is also reusable in that it is only necessary to replace the retaining element following each actuation. The shape-memory actuating element can be operated an indefinite number of times, whereas in an explosive separation device the actuating element, which is the deflagrating charge, can operate only once.

Activation of the separation devices of this invention is by heating, such as by electrical current or exothermic chemical process, which is gradual and does not involve a deflagrating charge as in an explosive bolt. In this invention a minimum energy is liberated at the time of separation. The amount of energy required to activate the shape-memory alloy material is a small fraction, on the order of substantially 1%, of that liberated in an explosion actuated separation device. This amount of energy is a difference in kind rather than degree. In the invention the actuation is not immediate or sudden, but takes place over a relatively long time span on the order of several seconds, as compared to an explosion actuated device where the time span of energy release upon the explosion is on the order of only a millisecond. This relatively much lower amount of energy released over a relatively much longer time span is an important consideration in the safety of the device. For example, the separation device of the invention can even be held in a person's hand during actuation without danger.

In the embodiment in which the shape memory material is activated by resistance heating it is a distinctive feature that the energy of activation is stored external to the device and is supplied to the shape-memory alloy element only at the time of activation. This is an inherently safer, cheaper and more reliable mode of operation than with explosive bolts where the energy of activation is stored in the deflagrating charge within the bolt.

The separation device of the invention is insensitive to transient electrical signals, which could cause accidental triggering in an explosive bolt or other device in which the energy is stored internally in a deflagrating charge.

The separation devices of this invention are relatively compact in that the shape memory materials generate a relatively high force and produce a large amount of work per unit mass in a small range of temperature. The separation devices of this invention are also readily scalable in size as required by the particular application. These devices are easily installed without the requirement for specialized tools, and the installment is relatively safe in that there is no risk of injury from an exploding charge.

The separation devices and method of operation of this invention provide for relatively good precision in the control of the time of release. The shape memory alloy is characterized in undergoing its shape change through a relatively small transition temperature range, and the component elements of the device can be designed so that the rate of heating and stress failure characteristics of the retaining element are selected so that the release time from the point of activation can be predicted within close tolerances.

The invention also provides a simple method for the non-destructive testing of the integrity and readiness of an electrically activated separation device, and also a simple method for calibrating the control circuit for predicting the time of separation following activation.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method for securing together and non-explosively separating multiple components of an apparatus comprising the steps of attaching the components together with a retaining element formed with a strain concentrated portion which cleaves when the element is strained at a predetermined magnitude, connecting with the retaining element an actuating element which is comprised of a solid state phase change material having a shape memory which recovers from an armed shape to a memory shape when heated through a phase-change temperature range, deforming the actuating element while at a temperature below said phase-change temperature range to said armed shape at which said retaining element holds the components together, locking the actuating element in said armed shape, and heating the actuating element to a temperature through said phase-change temperature range for causing recovery of the actuating element toward said memory shape and thereby straining the retaining element to said predetermined magnitude to cause said strain concentrated portion to cleave and separate the retaining element into exactly two pieces.

2. A method as in claim 1 in which said actuating element is mounted to apply a tension force to said retaining element during said recovery from the armed shape to the memory shape, said step of deforming the actuating element to the armed shape while at a temperature below the phase-change temperature range is carried out by compressing the actuating element, and said step of applying heat to the actuating element causes the same to recover by expanding from the armed shape to the memory shape for applying stress in tension to the retaining element.

3. A method as in claim 1 in which the step of deforming the actuating element while below the phase-change temperature range is carried out by applying tension to the actuating element for elongating the same to the armed shape, and the step of heating the actuating element through the phase-change temperature range causes the actuating element to thereby recover by contracting to the memory shape and thereby apply said strain in compression to the retaining element.

4. A method as in claim 1 in which said retaining element has a predetermined ultimate tensile strength, including the step of heating the actuating element to cause it to thereby recover toward the memory shape which applies a tension force on the retaining element which stresses the strain concentrated portion beyond said ultimate tensile strength to cause cleavage of the strain concentrated portion.

5. A method as in claim 1 in which said retaining element has a predetermined ultimate shear strength, including the step of heating the actuating element to cause it to thereby recover toward the memory shape generates a shear force at said strain concentrated portion which strains the same beyond said ultimate shear strength to cause said strain concentrated portion to cleave.

6. A method as in claim 1 in which said retaining element has a predetermined ultimate compression strength, including the step of heating the actuating element to cause it to thereby recover toward the memory shape generates a compressive force which strains the same beyond said ultimate compressive strength to cause said strain concentrated portion to cleave.

7. A method as in claim 1 in which the step of heating the actuating element is carried out by passing an electrical current through a conductor for causing resistance heating thereof, and holding the conductor in heat exchange relationship with the actuating element.

8. A method as in claim 1 in which the step of heating the actuating element is carried out by passing an electrical current through the actuating element for causing resistance heating thereof.

9. A method as in claim 1 in which the step of heating the actuating element is carried out by causing an exothermic compound to chemically react and release thermal energy while holding the compound in heat exchange relationship with the actuating element.

* * * * *